United States Patent [19]

Yamakawa

[11] Patent Number: 4,875,763
[45] Date of Patent: Oct. 24, 1989

[54] VIDEO PROJECTOR LENS SYSTEM
[75] Inventor: Kazuo Yamakawa, Osaka, Japan
[73] Assignee: Minolta Camera Kabushiki Kaisha, Osaka, Japan
[21] Appl. No.: 937,968
[22] Filed: Dec. 4, 1986
[30] Foreign Application Priority Data
   Dec. 11, 1985 [JP]   Japan ................ 60-279923
[51] Int. Cl.$^4$ .............................................. G02B 13/18
[52] U.S. Cl. ....................................... 350/432; 350/412
[58] Field of Search .............. 350/432, 412, 433, 434, 350/435

[56]            References Cited
          U.S. PATENT DOCUMENTS 4,530,575  7/1985  Yamakawa ................... 350/412 X
   4,577,935  3/1986  Yamakawa et al. ........... 350/412 X
   4,595,263  6/1986  Clarke ........................... 350/432
   4,758,074  7/1988  Yamakawa ................... 350/412 X

FOREIGN PATENT DOCUMENTS 56-78815   6/1981  Japan .
   59-133517  7/1984  Japan .
   59-170812  9/1984  Japan .
   60-115908  6/1985  Japan .

Primary Examiner—Scott J. Sugarman
Attorney, Agent, or Firm—Price, Gess & Ubell

[57]            ABSTRACT

The present invention provides a video projector lens system for projecting onto a screen a video image formed on a face plate of a cathode ray tube, with having high optical performance, large aperture, or matching for applying optical coupling technique. The lens system comprises, from the screen side to the tube side; a first positive lens having a screen side convex surface; a second negative meniscus lens having a screen side convex surface; a third bi-convex lens made of a glass material; and a fourth negative lens having a screen side concave surface. The lens system includes at least one aspheric surface and fulfills the following condition;

$$|f_2/f| > 8$$

wherein f represents a focal length of the whole lens system; and $f_2$ represents a focal length of the second lens.

10 Claims, 6 Drawing Sheets

Spherical Aberration

Astigmatism

F1.05

-1.0  1.0
Spherical Aberration

ω
26.5°

DS
DT

-1.0  1.0
Astigmatism

Spherical Aberration

Astigmatism

Spherical Aberration

Astigmatism

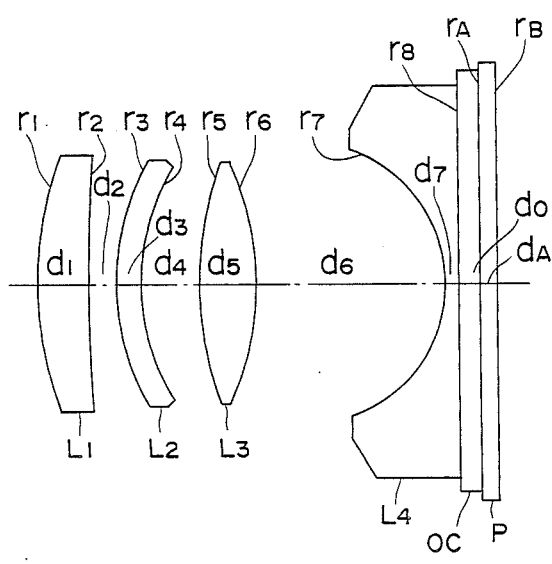
FIG.9
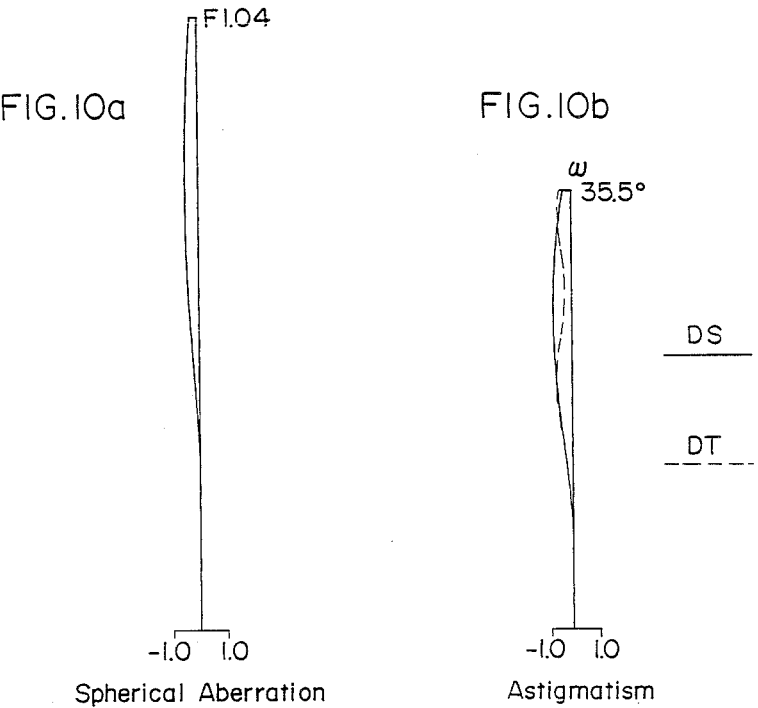
FIG.10a — Spherical Aberration
FIG.10b — Astigmatism Spherical Aberration Astigmatism

VIDEO PROJECTOR LENS SYSTEM

BACKGROUND OF THE INVENTION

1. Field of the Invention

The present invention relates to a lens system for a video projector, and more particularly to a refractive type lens system located in front of a cathode ray tube for projecting onto a screen a video image formed on a face plate of the cathode ray tube.

2. Description of the Prior Art

Recently, various types of lens systems have been provided with the development of video projectors. The various types of lens systems are designed for complying with the request for providing higher performance of the lens system, larger aperture thereof, or a wider angle of view thereof, respectively. Furthermore, a new technique called "optical coupling", in which a space formed between the cathode ray tube and the lens system is filled with a proper material, is suggested for cooling the space or for decreasing the reflection caused on the optical surfaces therebetween. Thus, a plurality of designs of the video projector lens systems have been proposed for matching the new technique.

SUMMARY OF THE INVENTION

An object of the present invention is to provide a lens system for a video projector which has a higher optical performance, a larger aperture thereof or a wider angle of view thereof, compared with the conventional designs.

An other object of the present invention is to provide a lens system for a video projector which can comply with the design demands above within acceptable aberrations.

Further other object of the present invention is to provide a lens system for a video projector which has a smaller F-number of 2.0.

The present invention provides a video projector lens system for projecting onto a screen, a video image formed on a face plate of a cathode ray tube comprising, from the screen side to the tube side, a first positive lens having a screen side convex surface; a second negative meniscus lens having a screen side convex surface; a third bi-convex lens made of a glass material; and a fourth negative lens having a screen side concave surface; wherein the lens system includes at least one aspheric surface and fulfills the following condition;

$$|f_2/f| > 8$$

wherein f represents a focal length of the whole lens system; and $f_2$ represents a focal length of the second lens.

The features of the present invention, which are believed to be novel, are set forth with particularity in the appending claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 9 represents a schematic cross sectional view of the fifth embodiment according to the present invention;

FIGS. 10a and 10b represents graphic plots of aberration curves of the fifth embodiment;

DETAILED DESCRIPTION OF THE PREFERRED EMBODIMENTS

The following specification, taken in conjunction with the drawings, sets forth the preferred embodiments of the present invention. The embodiments of the invention disclosed herein are the best modes contemplated by the inventor for carrying out his invention in the commercial optical video field, although it should be understood that various modifications can be accomplished within the parameters of the present invention.

Figure 1:
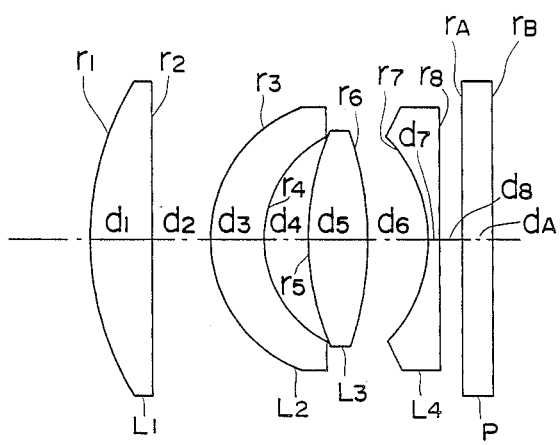
FIG. 1 represents a schematic cross sectional view of the first embodiment according to the present invention.
Figure 3:
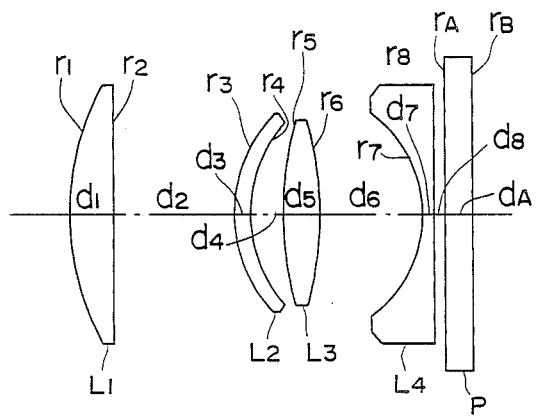
FIG. 3 represents a schematic cross sectional view of the second embodiment according to the present invention.
Figure 5:
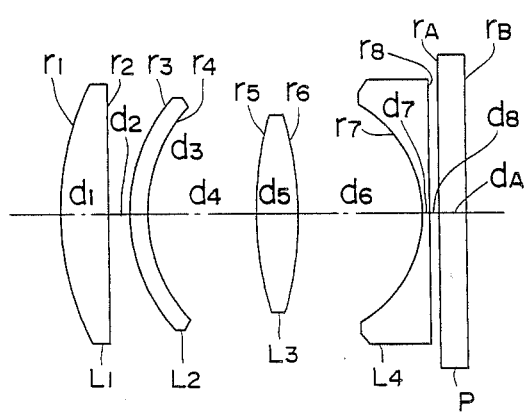
FIG. 5 represents a schematic cross sectional view of the third embodiment according to the present invention.
Figure 7:
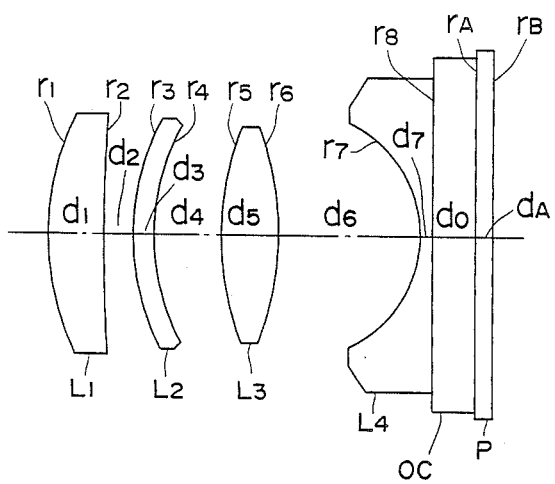
FIG. 7 represents a schematic cross sectional view of the fourth embodiment according to the present invention.
Figure 11:
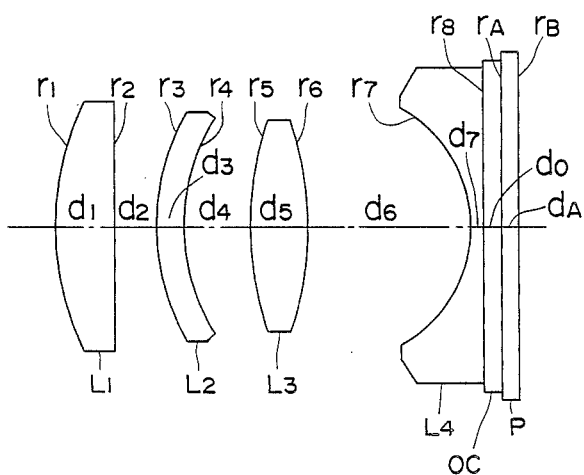
FIG. 11 represents a schematic cross sectional view of the sixth embodiment according to the present invention.

As shown in FIGS. 1, 3, 5, 7, 9 and 11, the present invention provides a lens system for projecting onto a screen (not shown) a video image formed on a face plate P of a cathode ray tube, comprising, from the screen side to the tube side, a first positive lens $L_1$ having a screen side convex surface; a second negative meniscus lens $L_2$ having a screen side convex surface; a third bin-convex lens $L_3$ made of a glass material; and a fourth negative lens $L_4$ having a screen side concave surface; wherein the lens system includes at least one aspheric surface and fulfills the following condition;

$$|f_2/f| > 8 \qquad (1)$$

wherein f represents a focal length of the whole lens system, and $f_2$ represents a focal length of the second lens $L_2$.

According to the present invention, at least one aspheric surface is adopted by utilizing at least one plastic lens element for successfully correcting aberrations, while a glass material is adopted to form at least the third lens $L_3$, which bears a considerable part of the whole positive refractive power distributed in the lens system, for the purpose of reducing the temperature depending variation of the optical performance of the lens system. The glass element $L_3$ is also effective to shield the X-ray radiation caused by the fluorescent surface of the cathode ray tube.

Condition (1) defines the refractive power of the second lens $L_2$ for providing a balancing between the aberrations in the axial region and that in the off-axial region. If the condition (1) is violated, spherical aberration of high degrees and negative deviation of field curvature would be caused and it becomes difficult to provide a video projector lens system having a large aperture and high performance.

In accordance with the present invention, the lens system is further recommended to fulfill the following conditions:

$$f_2/r_3 < -6 \quad (2)$$

$$n_3 > 1.55 \quad (3)$$

wherein, $r_3$ represents a radius of curvature of the screen side surface $r_3$ of the second lens $L_2$, and $n_3$ represents a refractive index of the third lens $L_3$.

Condition (2) defines the relation between the refractive power of the second lens $L_2$ and the radius of curvature of the screen side surface $r_3$ of the second lens $L_2$. If the condition (2) is violated, the field curvature would be in an over-corrected condition and sagittal flare of off-axial light rays would be generated.

Condition (3) defines the refractive index $n_3$ of the third lens $L_3$ made of a glass material. If the condition (3) is violated, any practical glass material effective to sufficiently shield X-ray radiation would be difficult to be obtained. And it would also be difficult to properly correct various aberrations with good balance. Because, if a glass material having no aspheric surface is applied to the third lens $L_3$, it would be difficult to correct various aberration, especially the spherical aberration, with good balance, since the radii of curvature of the third lens $L_3$ becomes too small for keeping a proper refractive power of the third lens $L_3$.

According to the present invention, together with the above conditions (1) to (3), the lens system is further recommended to fulfill the following condition:

$$0.4 < r_3/f < 2.0 \quad (4)$$

Condition (4) defines the radius of curvature of the screen side surface $r_3$ of the second lens $L_2$ relative to the focal length of the whole lens system. If the upper limit of condition (4) is violated, field curvature would be in an over-correction condition and sagittal flare of the off-axial light pencil would be generated. On the other hand, if the lower limit of the condition (4) is violated, spherical aberration of high degrees and negative deviation of field curvature would be caused.

The following Tables 1 to 6 show first to sixth embodiments according to the present invention, respectively. In the Tables, radii of curvature, $r_1$, $r_2$, - - - ; axial distances, $d_1$, $d_2$, - - - ; refractive indices for light of d-line (with a wavelength, 587.6 nm), $N_1$, $N_2$, - - - ; and Abbe numbers for light of d-line, $\gamma_1$, $\gamma_2$, - - - ; are numbered from the screen side. Further the radius of curvature with asterisk (*) means that the corresponding surface is an aspheric surface defined by the following formula;

$$X = \frac{C_0 Y^2}{1 + (1 - C_0^2 Y^2)^{\frac{1}{2}}} + \sum_{i=1}^{8} C_i Y^{2i}$$

wherein: X represents the coordinate along the optical axis measured from the top of the aspheric surface toward the tube side; Y represents the coordinate perpendicular to the optical axis measured from the optical axis (height from the optical axis); $C_0$ represents the curvature of the basic spheric surface of radius of curvature r ($C_0 = 1/r$) of the aspheric surface; and $C_i$ represents the aspheric surface coefficient. The lower part of Tables 1 to 6 summarizes the values for aspheric surface coefficients with respect to aspheric surfaces in each of the embodiments. (Radius of curvature of the aspheric surface in the paraxial region is equal to $C_0 + 2C_1$.)

In the Tables, P represents the face plate of the cathode ray tube, and $r_A$ and $r_B$ represent its screen side surface and its fluorescent surface, respectively. The distance $d_8$ represent an axial distance of air space formed between the last surface of the lens system (namely, the tube side surface $r_8$ of the fourth lens $L_4$) and the face plate P.

Embodiments 4 to 6 are designed for applying the above new technique called "optical coupling" in which an air space formed between the fourth lens $L_4$ and the face plate P is filled up by a predetermined material OC. The axial thickness of the material OC is represented by do; the refractive index thereof is represented by No; and the Abbe number thereof is represented by o, respectively. Here, although a single material is applied for filling up the air space formed between the fourth lens $L_4$ and the face plate P in the embodiments 4 to 6, plurality of materials can be applied therefor. In such case, the optical performance of the lens system is hardly influenced by the materials if the thicknesses of plurality of materials are adjusted in accordance with the refractive indices thereof.

In the following Tables, f represents the focal length of the whole lens system; $\beta$ represents the lateral magnification thereof; $F_{NO}$ represents F-number thereof; and $2\omega$ represents field of view thereof.

Figure 2A:
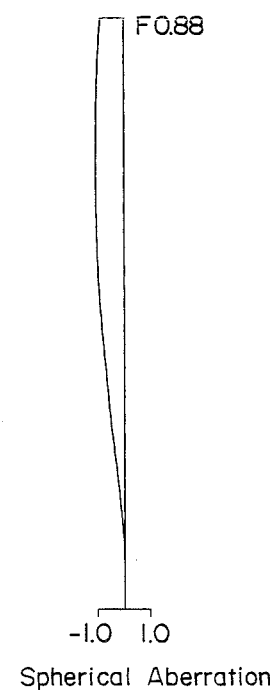
FIGS. 2a and 2b represents graphic plots of aberration curves of the first embodiment.
Figure 2B:
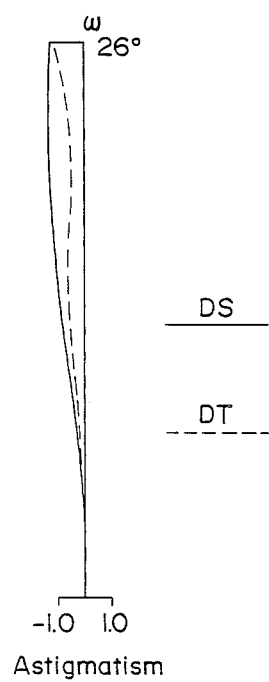
Figure 4A:
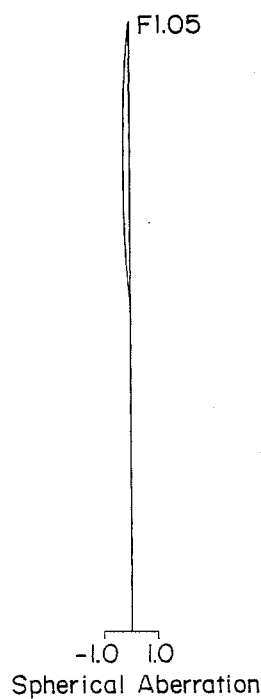
FIGS. 4a and 4b represents graphic plots of aberration curves of the second embodiment.
Figure 4B:
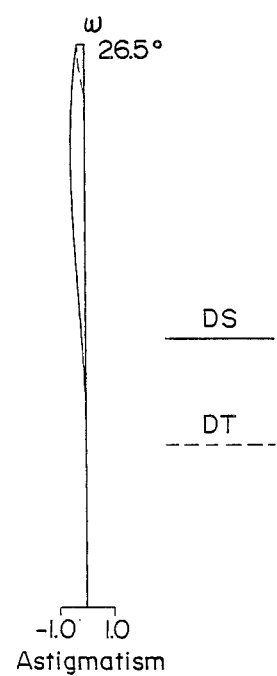
Figure 6A:
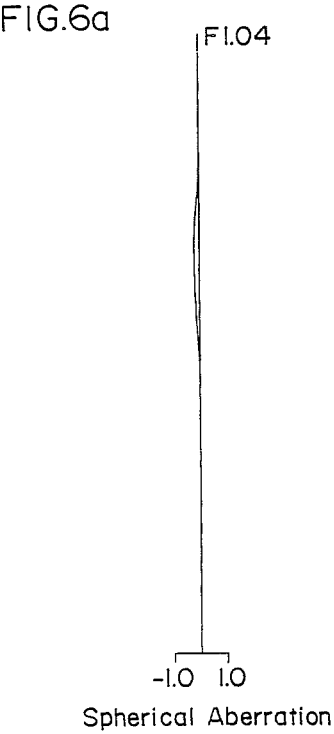
FIGS. 6a and 6b represents graphic plots of aberration curves of the third embodiment.
Figure 6B:
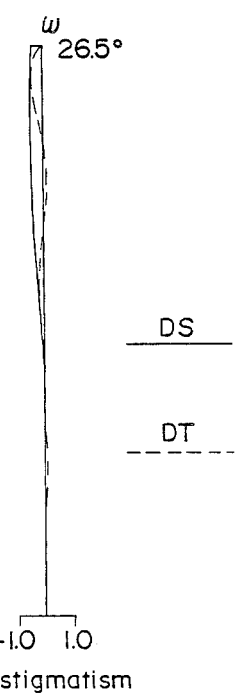
Figure 8A:
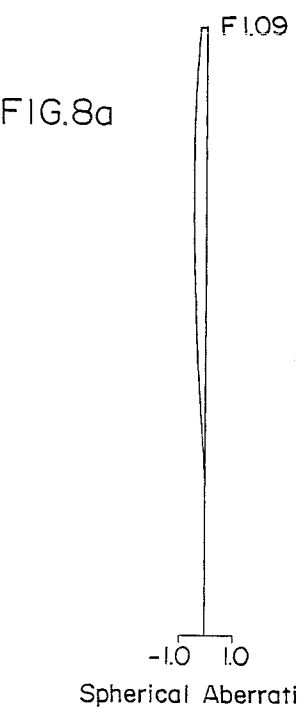
FIGS. 8a and 8b represents graphic plots of aberration curves of the fourth embodiment.
Figure 8B:
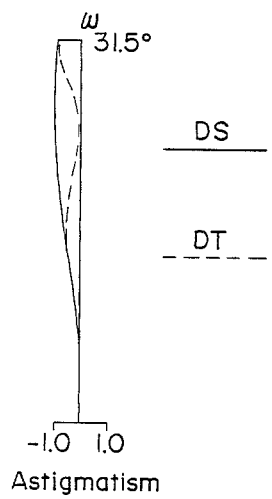
Figure 12A:
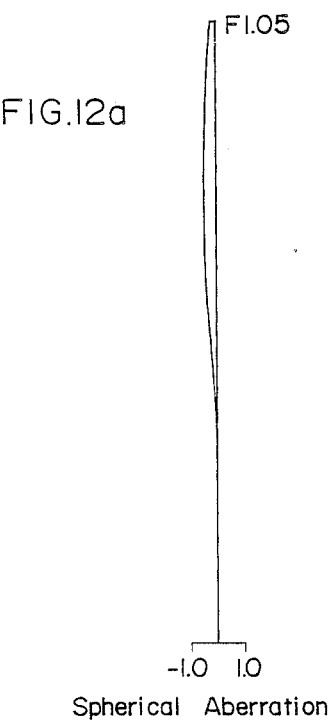
FIGS. 12a and 12b represents graphic plots of aberration curves of the sixth embodiment.
Figure 12B:
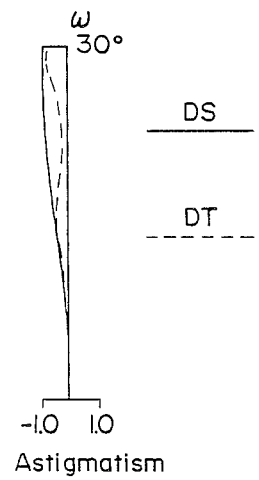

FIGS. 1, 3, 5, 7, 9, and 11 represent the cross sectional views of the first to sixth embodiments, respectively. FIGS. 2, 4, 6, 8, 10 and 12 represent aberration curves of the first to sixth embodiments, respectively.

Embodiment 1 is designed for complying the request for providing a large aperture lens system; embodiments 2 and 3 are designed for complying with the other request for getting a lens system having a high optical performance; while embodiments 4 to 6 are designed for matching the new technique called "optical coupling".

Table 7 represents the relation between the parameters of condition (1) to (4) and the embodiments 1 to 6, respectively.

TABLE 1

Embodiment 1
$f = 100 \quad \beta = -0.057 \quad F_{NO} = 0.88 \quad 2\omega = 52°$

| | radius of curvature | axial distance | refractive index (Nd) | Abbe number ($\nu d$) |
|---|---|---|---|---|
| $L_1$ | $r_1^*$ 88.15 | $d_1$ 22.88 $N_1$ 1.491 $\nu_1$ | | 57.8 |
| | $r_2$ | $d_2$ 21.68 | | |
| $L_2$ | $r_3$ 51.95 | $d_3$ 20.48 $N_2$ 1.491 $\nu_2$ | | 57.8 |
| | $r_4$ 42.55 | $d_4$ 15.66 | | |
| $L_3$ | $r_5$ 98.69 | $d_5$ 22.88 $N_3$ 1.620 $\nu_3$ | | 60.3 |
| | $r_6$ −122.12 | $d_6$ 22.44 | | |
| $L_4$ | $r_7^*$ −54.48 | $d_7$ 4.46 $N_4$ 1.491 $\nu_4$ | | 57.8 |
| | $r_8$ | $d_8$ 8.94 | | |
| P | $r_A$ | $d_A$ 11.56 $N_A$ 1.536 $\nu_A$ | | 51.0 |

TABLE 1-continued $r_B$

*Aspheric surface coefficients

| | $r_1$ | $r_7$ |
|---|---|---|
| $C_2$ | $-0.23710 \times 10^{-6}$ | $-0.17169 \times 10^{-5}$ |
| $C_3$ | $0.52520 \times 10^{-10}$ | $0.24018 \times 10^{-8}$ |
| $C_4$ | $-0.70551 \times 10^{-13}$ | $-0.24915 \times 10^{-11}$ |
| $C_5$ | $0.15416 \times 10^{-16}$ | $0.15850 \times 10^{-14}$ |
| $C_6$ | $0.33517 \times 10^{-21}$ | $-0.29213 \times 10^{-18}$ |
| $C_7$ | $-0.41349 \times 10^{-24}$ | 0.0 |
| $C_8$ | $-0.18668 \times 10^{-28}$ | 0.0 |

TABLE 2

Embodiment 2

$f = 100$, $\beta = -0.052$, $F_{NO} = 1.05$, $2\omega = 53°$

| | radius of curvature | axial distance | refractive index (Nd) | Abbe number ($\nu$d) |
|---|---|---|---|---|
| $L_1$ | $r_1$* 91.82 | | | |
| | | $d_1$ 16.44 | $N_1$ 1.491 | $\nu_1$ 57.8 |
| | $r_2$ | | | |
| | | $d_2$ 44.86 | | |
| | $r_3$ 54.82 | | | |
| $L_2$ | | $d_3$ 6.51 | $N_2$ 1.491 | $\nu_2$ 57.8 |
| | $r_4$ 51.67 | | | |
| | | $d_4$ 11.09 | | |
| | $r_5$ 109.24 | | | |
| $L_3$ | | $d_5$ 14.24 | $N_3$ 1.620 | $\nu_3$ 60.3 |
| | $r_6$ −147.17 | | | |
| | | $d_6$ 39.45 | | |
| | $r_7$* −40.85 | | | |
| $L_4$ | | $d_7$ 3.42 | $N_4$ 1.491 | $\nu_4$ 57.8 |
| | $r_8$ | | | |
| | | $d_8$ 4.18 | | |
| | $r_A$ | | | |
| P | | $d_A$ 10.27 | $N_A$ 1.536 | $\nu_A$ 50.7 |
| | $r_B$ | | | |

| | $r_1$ | $r_7$ |
|---|---|---|
| $C_2$ | $-0.30467 \times 10^{-6}$ | $-0.50306 \times 10^{-6}$ |
| $C_3$ | $-0.20483 \times 10^{-10}$ | $0.33291 \times 10^{-8}$ |
| $C_4$ | $-0.12407 \times 10^{-13}$ | $-0.22672 \times 10^{-11}$ |
| $C_5$ | 0.0 | $0.96090 \times 10^{-15}$ |
| $C_6$ | 0.0 | $0.10010 \times 10^{-18}$ |
| $C_7$ | 0.0 | $0.32306 \times 10^{-22}$ |
| $C_8$ | 0.0 | $0.46381 \times 10^{-26}$ |

*Aspheric surface coefficients

TABLE 3

Embodiment 3

$f = 100$, $\beta = -0.061$, $F_{NO} = 1.04$, $2\omega = 53°$

| | radius of curvature | axial distance | refractive index (Nd) | Abbe number (d) |
|---|---|---|---|---|
| $L_1$ | $r_1$* 95.00 | | | |
| | | $d_1$ 17.76 | $N_1$ 1.491 | $\nu_1$ 57.8 |
| | $r_2$ 3054.46 | | | |
| | | $d_2$ 7.35 | | |
| | $r_3$ 63.08 | | | |
| $L_2$ | | $d_3$ 6.92 | $N_2$ 1.491 | $\nu_2$ 57.8 |
| | $r_4$ 59.15 | | | |
| | | $d_4$ 40.32 | | |
| | $r_5$ 126.24 | | | |
| $L_3$ | | $d_5$ 16.01 | $N_3$ 1.620 | $\nu_3$ 60.3 |
| | $r_6$ −134.52 | | | |
| | | $d_6$ 46.22 | | |
| | $r_7$* −40.92 | | | |
| $L_4$ | | $d_7$ 3.43 | $N_4$ 1.491 | $\nu_4$ 57.8 |
| | $r_8$ | | | |
| | | $d_8$ 3.57 | | |
| | $r_A$ | | | |
| P | | $d_A$ 10.30 | $N_A$ 1.536 | $\nu_A$ 50.7 |
| | $r_B$ | | | |

| | $r_1$ | $r_7$ |
|---|---|---|
| $C_2$ | $-0.34117 \times 10^{-6}$ | $-0.35350 \times 10^{-5}$ |
| $C_3$ | $0.16365 \times 10^{-10}$ | $0.20649 \times 10^{-7}$ |
| $C_4$ | $-0.61275 \times 10^{-13}$ | $-0.38217 \times 10^{-10}$ |

TABLE 3-continued

Embodiment 3

| | | | |
|---|---|---|---|
| $C_5$ | $0.20273 \times 10^{-16}$ | $0.37107 \times 10^{-13}$ | |
| $C_6$ | $-0.30720 \times 10^{-20}$ | $-0.17379 \times 10^{-16}$ | |
| $C_7$ | 0.0 | $0.28540 \times 10^{-20}$ | |
| $C_8$ | 0.0 | $0.25736 \times 10^{-24}$ | |

*Aspheric surface coefficients

TABLE 4

Embodiment 4

$f = 100$, $\beta = -0.134$, $F_{NO} = 1.09$, $2\omega = 63°$

| | radius of curvature | axial distance | refractive index (Nd) | Abbe number (d) |
|---|---|---|---|---|
| $L_1$ | $r_1$* 94.09 | | | |
| | | $d_1$ 20.05 | $N_1$ 1.491 | $\nu_1$ 57.8 |
| | $r_2$ 554.74 | | | |
| | | $d_2$ 11.61 | | |
| | $r_3$ 105.92 | | | |
| $L_2$ | | $d_3$ 7.68 | $N_2$ 1.491 | $\nu_2$ 57.8 |
| | $r_4$ 100.85 | | | |
| | | $d_4$ 25.25 | | |
| | $r_5$ 138.71 | | | |
| $L_3$ | | $d_5$ 20.94 | $N_3$ 1.620 | $\nu_3$ 60.3 |
| | $r_6$ −131.50 | | | |
| | | $d_6$ 53.55 | | |
| | $r_7$* −47.89 | | | |
| $L_4$ | | $d_7$ 4.63 | $N_4$ 1.491 | $\nu_4$ 57.8 |
| | $r_8$ | | | |
| OC | | $d_0$ 16.18 | $N_0$ 1.410 | $\nu_0$ 51.5 |
| | $r_A$ | | | |
| P | | $d_A$ 6.48 | $N_A$ 1.536 | $\nu_A$ 51.0 |
| | $r_B$ | | | |

| | $r_1$ | $r_7$ |
|---|---|---|
| $C_2$ | $-0.35475 \times 10^{-6}$ | $-0.18152 \times 10^{-5}$ |
| $C_3$ | $0.32865 \times 10^{-10}$ | $0.30577 \times 10^{-8}$ |
| $C_4$ | $-0.29306 \times 10^{-13}$ | $-0.27100 \times 10^{-11}$ |
| $C_5$ | $0.73884 \times 10^{-17}$ | $0.11030 \times 10^{-14}$ |
| $C_6$ | $-0.12281 \times 10^{-20}$ | $-0.10793 \times 10^{-18}$ |
| $C_7$ | 0.0 | 0.0 |
| $C_8$ | 0.0 | 0.0 |

*Aspheric surface coefficients

TABLE 5

Embodiment 5

$f = 100$, $\beta = -0.126$, $F_{NO} = 1.04$, $2\omega = 71°$

| | radius of curvature | axial distance | refractive index (Nd) | Abbe number ($\nu$d) |
|---|---|---|---|---|
| $L_1$ | $r_1$* 110.68 | | | |
| | | $d_1$ 18.10 | $N_1$ 1.491 | $\nu_1$ 57.8 |
| | $r_2$ 487.74 | | | |
| | | $d_2$ 11.60 | | |
| | $r_3$ 108.21 | | | |
| $L_2$ | | $d_3$ 8.61 | $N_2$ 1.491 | $\nu_2$ 57.8 |
| | $r_4$ 90.33 | | | |
| | | $d_4$ 22.15 | | |
| | $r_5$ 149.03 | | | |
| $L_3$ | | $d_5$ 20.96 | $N_3$ 1.620 | $\nu_3$ 60.3 |
| | $r_6$ −116.30 | | | |
| | | $d_6$ 70.68 | | |
| | $r_7$* −55.86 | | | |
| $L_4$ | | $d_7$ 4.56 | $N_4$ 1.491 | $\nu_4$ 57.8 |
| | $r_8$ | | | |
| OC | | $d_0$ 8.01 | $N_0$ 1.410 | $\nu_0$ 51.5 |
| | $r_A$ | | | |
| P | | $d_A$ 6.38 | $N_A$ 1.536 | $\nu_A$ 50.7 |
| | $r_B$ | | | |

| | $r_1$ | $r_7$ |
|---|---|---|
| $C_2$ | $-0.42084 \times 10^{-6}$ | $-0.39019 \times 10^{-5}$ |
| $C_3$ | $-0.27029 \times 10^{-10}$ | $0.37529 \times 10^{-8}$ |
| $C_4$ | $-0.36641 \times 10^{-13}$ | $-0.21798 \times 10^{-11}$ |
| $C_5$ | $0.10107 \times 10^{-16}$ | $0.63317 \times 10^{-15}$ |
| $C_6$ | $-0.16601 \times 10^{-20}$ | $-0.61533 \times 10^{-19}$ |
| $C_7$ | 0.0 | 0.0 |

TABLE 5-continued

Embodiment 5

| | | |
|---|---|---|
| $C_8$ | 0.0 | 0.0 |

*Aspheric surface coefficients

TABLE 6

Embodiment 6

| | f = 100 radius of curvature | $\beta = -0.126$ axial distance | $F_{NO} = 1.05$ refractive index (Nd) | $2\omega = 60°$ Abbe number ($\nu$d) |
|---|---|---|---|---|
| $L_1$ | $r_1^*$ 103.55 | $d_1$ 21.59 | $N_1$ 1.491 | $\nu_1$ 57.8 |
| | $r_2$ 22899.02 | $d_2$ 16.11 | | |
| $L_2$ | $r_3$ 108.37 | $d_3$ 9.69 | $N_2$ 1.491 | $\nu_2$ 57.8 |
| | $r_4$ 84.46 | $d_4$ 24.15 | | |
| $L_3$ | $r_5$ 136.25 | $d_5$ 22.32 | $N_3$ 1.620 | $\nu_3$ 60.3 |
| | $r_6$ −133.00 | $d_6$ 60.83 | | |
| $L_4$ | $r_7^*$ −49.44 | $d_7$ 4.60 | $N_4$ 1.491 | $\nu_4$ 57.8 |
| OC | $r_8$ | $d_0$ 6.75 | $N_0$ 1.410 | $\nu_0$ 51.5 |
| P | $r_A$ | $d_A$ 6.44 | $N_A$ 1.536 | $\nu_A$ 50.7 |
| | $r_B$ | | | |

| | $r_1$ | $r_7$ |
|---|---|---|
| $C_2$ | $-0.31727 \times 10^{-6}$ | $-0.19929 \times 10^{-5}$ |
| $C_3$ | $-0.18389 \times 10^{-10}$ | $0.34553 \times 10^{-8}$ |
| $C_4$ | $-0.31434 \times 10^{-13}$ | $-0.23956 \times 10^{-11}$ |
| $C_5$ | $0.86215 \times 10^{-17}$ | $0.76743 \times 10^{-15}$ |
| $C_6$ | $-0.10445 \times 10^{-20}$ | $-0.47113 \times 10^{-19}$ |
| $C_7$ | 0.0 | 0.0 |
| $C_8$ | 0.0 | 0.0 |

*Aspheric surface coefficients

TABLE 7

| Condition Parameter | (1) $|f_2/f|$ | (2) $f_2/r_3$ | (3) $N_3$ | (4) $r_3/f$ |
|---|---|---|---|---|
| Embodiment 1 | 16.9 | −32.57 | 1.62 | 0.51 |
| 2 | 57.5 | −105.03 | 1.62 | 0.54 |
| 3 | 45.9 | −72.79 | 1.62 | 0.63 |
| 4 | 85.3 | −80.6 | 1.62 | 1.05 |
| 5 | 13.2 | −12.22 | 1.62 | 1.08 |
| 6 | 8.9 | −8.30 | 1.62 | 1.08 |

What is claimed is:

1. A lens system for projecting onto a screen a video image formed on a face plate of a cathode ray tube comprising, from the screen side to the tube side;
   a first positive lens having a screen side convex surface;
   a second negative meniscus lens having a screen side convex surface;
   a third bi-convex lens made of a glass material; and
   a fourth negative lens having a screen side concave surface;
   wherein the lens system includes at least one aspheric surface and fulfills the following condition;

$$|f_2/f| > 8$$

$$f_2/r_3 < -6$$

wherein:
   f represents a focal length of the whole lens system;
   $f_2$ represents a focal length of the second lens; and
   $r_3$ represents a radius of curvature of the screen side surface of the second lens.

2. A lens system as claimed in claim 1, wherein the lens system further fulfills the following conditions;

$$N_3 > 1.55$$

wherein:
   $N_3$ represents a refractive index of the third lens.

3. A lens system as claimed in claim 2, wherein the lens system further fulfills the following condition:

$$0.4 < r_3/f < 2.0.$$

4. A lens system as claimed in claim 3, wherein the screen side surface of the first lens is aspheric.

5. A lens system as claimed in claim 4, wherein the screen side surface of the fourth lens is aspheric.

6. A lens system for projecting onto a screen a video image formed on a face plate of a cathode ray tube comprising, from the screen side to the tube side;
   a first positive lens having a screen side convex surface;
   a second negative meniscus lens having a screen side convex surface;
   a third bi-convex lens made of a glass material; and
   a fourth negative lens having a screen side concave surface;
   wherein the lens system includes at least one aspheric surface and fulfills the following condition;

$$f_2/r_3 < -6$$

$$N_3 > 1.55$$

wherein:
   $f_2$ represents a focal length of the second lens;
   $r_3$ represents a radius of curvature of the screen side surface of the second lens; and
   $N_3$ represents a refractive index of the third lens.

7. A lens system as claimed in claim 6, wherein the lens system further fulfills the following condition;

$$0.4 < r_3/f < 2.0$$

wherein:
   f represents a focal length of the whole lens system.

8. A lens system as claimed in claim 7, wherein the screen side surface of the first lens is aspheric.

9. A lens system as claimed in claim 8, wherein the screen side surface of the fourth lens is aspheric.

10. A lens system for projecting onto a screen a video image formed on a face plate of a cathode ray tube comprising, from the screen side to the tube side:
   a first positive lens having a screen side convex surface, the screen side surface being aspheric;
   a second negative meniscus lens having a screen side convex surface;
   a third bi-convex lens made of a glass material, and
   a fourth negative lens having a screen side concave surface, the screen side surface being aspheric;
   wherein the lens system fulfills the following conditions:

$$|f_2/f| > 8$$
$$f_2/r_3 < -6$$
$$N_3 > 1.55$$
$$0.4 < r_3/f < 2.0$$

where:
   f represents a focal length of the whole lens system;

$f_2$ represents a focal length of the second lens;

$r_3$ represents a radius of curvature of the screen side surface of the second lens, and $N_3$ represents a refractive index of the third lens; and further wherein the lens system comprises the following design parameters, wherein asterisk (*) represent the aspheric surface with the following aspheric surface coefficients $C_i$:

|  | f = 100 radius of curvature | β = −0.126 axial distance | $F_{NO}$ = 1.05 refractive index (Nd) | 2ω = 60° Abbe number (d) |
|---|---|---|---|---|
| $L_1$ | $r_1$* 103.55 | $d_1$ 21.59 | $N_1$ 1.491 | $v_1$ 57.8 |
|  | $r_2$ 22899.02 |  |  |  |

-continued

|  | f = 100 radius of curvature | β = −0.126 axial distance | $F_{NO}$ = 1.05 refractive index (Nd) | 2ω = 60° Abbe number (d) |
|---|---|---|---|---|
|  |  | $d_2$ 16.11 |  |  |
| $L_2$ | $r_3$ 108.37 | $d_3$ 9.69 | $N_2$ 1.491 | $v_2$ 57.8 |
|  | $r_4$ 84.46 | $d_4$ 24.15 |  |  |
| $L_3$ | $r_5$ 136.25 | $d_5$ 22.32 | $N_3$ 1.620 | $v_3$ 60.3 |
|  | $r_6$ −133.00 | $d_6$ 60.83 |  |  |
| $L_4$ | $r_7$* −49.44 | $d_7$ 4.60 | $N_4$ 1.491 | $v_4$ 57.8 |
|  | $r_8$ |  |  |  |
| OC | $r_A$ | $d_o$ 6.75 | $N_o$ 1.410 | $v_o$ 51.5 |
| P | $r_B$ | $d_A$ 6.44 | $N_A$ 1.536 | $v_A$ 50.7 |

* * * * *